(No Model.) 2 Sheets—Sheet 2.
H. C. P. LE PAN.
WELDING FURNACE.
No. 394,865. Patented Dec. 18, 1888.
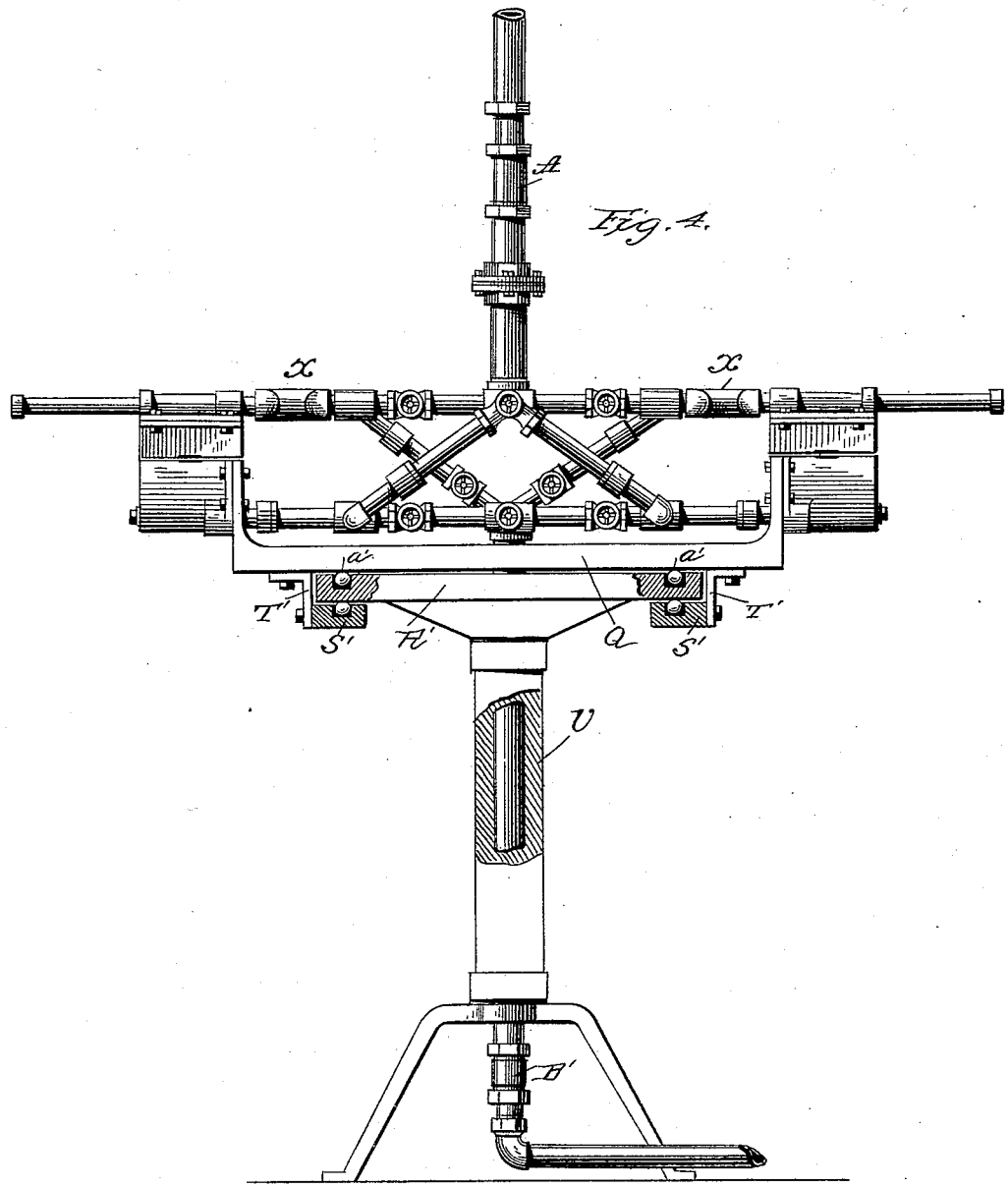
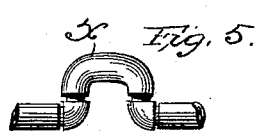
Attest
Walter Donaldson
F. L. Middleton
Inventor
Henry C. P. Le Pan.
by Ellis Spear
Atty

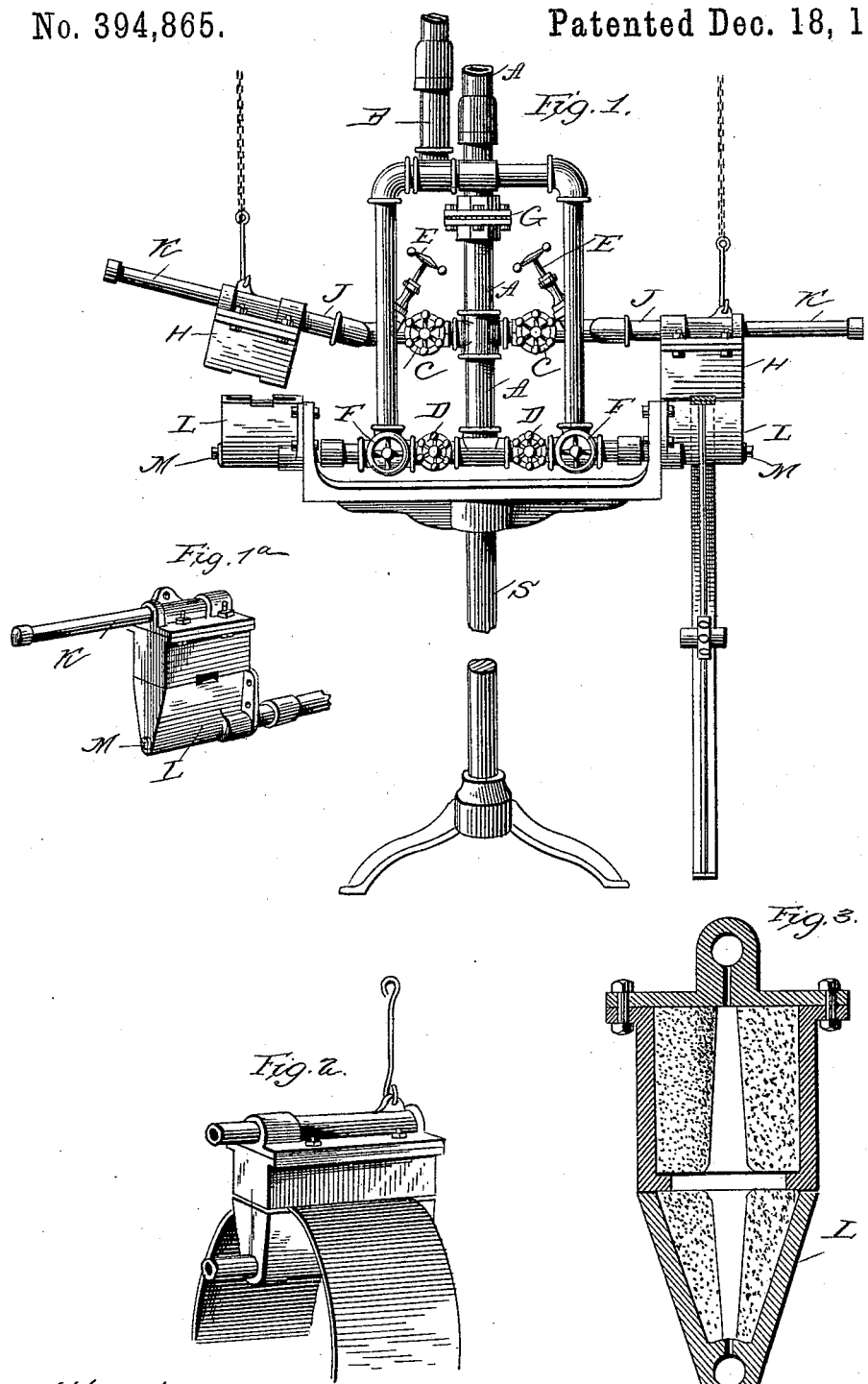

UNITED STATES PATENT OFFICE.

HENRY C. P. LE PAN, OF CHICAGO, ILLINOIS.

WELDING-FURNACE.

SPECIFICATION forming part of Letters Patent No. 394,865, dated December 18, 1888.

Application filed April 14, 1888. Serial No. 270,674. (No model.)

*To all whom it may concern:*

Be it known that I, HENRY C. P. LE PAN, of Chicago, in the county of Cook and State of Illinois, have invented a new and useful Improvement in Welding-Furnaces; and I do hereby declare that the following is a full, clear, and exact description of the same.

It is the object of my invention to provide for the heating or welding of tires and other articles by the use of gas or liquid fuel. Heretofore in the heating or welding of tires, whether of metal wheels or tires for wooden wheels, the tires or other metallic articles have been heated to the proper heat in an ordinary smith's furnace, which is a very slow process, and incidentally requires the consumption of a great deal of fuel.

My invention is not only designed to provide a heating or welding furnace with gas, vapor, or liquid as the fuel used, but also a furnace by means of which the work may be done rapidly and uniformly and with a minimum amount of labor.

My invention consists of a heating or welding furnace for tires and other metallic articles, having a chamber provided with a suitable lining, with an opening to said chamber for the insertion of the article, and with a fuel-supply in connection therewith.

The invention further consists of a heating or welding furnace made in two parts, each part being in connection with a supply of mixed air and gas or liquid fuel, with a space between the parts in the direct line of the combustion of the fuel for the insertion of the parts of the article to be heated, one of the parts of the furnace being movable to admit of the insertion or withdrawal of the article.

My invention also consists of a heating or welding furnace for tires and other articles, made in two parts, one of said parts being movable to allow the placing of the article between them, each of said parts having a combustion-chamber, a gas, vapor, or liquid fuel supply, an air-supply for producing the combustion of the gas, vapor, or liquid, and pipe-connections to the two parts of the furnace.

The invention also consists of a series of heating-furnaces, each made in two parts, one of said parts being pivoted, with a space between the parts for the insertion of the article to be heated, connections with said furnaces from a fuel-supply, and a suitable stand for supporting the furnaces.

Finally, the invention consists of a series of heating or welding furnaces in connection with a fuel-supply, said furnaces being adapted to revolve.

In the drawings, Figure 1 is a side elevation of a pair of furnaces constructed according to my invention, the movable part of one of the furnaces being lifted, with a wheel shown in place with its tire between the parts of the other furnace. Fig. 1$^a$ is a detail perspective view of a single furnace. Fig. 2 is a perspective of a single furnace of a modified form, adapted for use in the welding of broad tires or bands. Fig. 3 is an enlarged detail sectional view of a furnace, showing the interior. Fig. 4 shows a series of furnaces mounted upon a revolving table. Fig. 5 is a detail view of one of the pipe-connections.

I support the furnace upon a suitable standard, S. While in the drawings I show this standard as provided with branching arms at the upper part, adapted to support two furnaces, I may have but one arm, or I may make this a revolving table, as in Fig. 4. A suitable supply-pipe, A, extends from any point of supply, whether of gas or vapor or liquid fuel adapted for heating purposes, and is in connection with my welding-furnaces, as hereinafter described. At G, I have shown a diaphragm made of gauze, which extends across the opening within the pipe, and prevents the flame from extending beyond that point, so as to prevent any back explosion.

My welding-furnace is composed of two parts, one being movable and the other stationary. The stationary part is fixed to the table, as shown in Fig. 1, and is composed of a casting or box lined inside with refractory material—such as fire-brick—and forming a combustion-chamber. This box is secured to angular projections from the table by means of bolts and nuts, as clearly shown. A pipe connects with the interior of the chamber of the box L, which furnishes to said box gas or vapor from the pipe A, the supply being regulated by a valve, D, in the branch pipe, and the necessary air for combustion is furnished through a branch of the pipe B, which extends into the branch pipe leading to the box L. A controlling-valve, E, is placed in the branch of the air-pipe to control the amount of air. A second branch pipe, provided with a valve, C, supplies the fuel to the upper part, H, of the furnace, and a branch from the air-pipe, provided with a valve, E, connects with the branch leading to the furnace to supply the proper amount of air to this part of the furnace also. This part of the furnace consists of a box, H, secured to the pipe J, which is connected to the branch from the gas-pipe by a pivotal connection, which allows the upper part of the furnace to be lifted, so as to allow of the insertion of the tire to be heated between the two parts.

Both the upper and lower parts of the furnace are provided with passages in connection with the gas-supply pipes, and these passages are in connection with the combustion-chamber proper through small openings, which constitute the burners for the two chambers of the furnace. The passages mentioned are provided with exit-openings, as shown at K and M, and when it is desired to clean them from any accumulation it is only necessary to unscrew the caps from over these openings and force a current of air through the passages.

The upper chamber of the furnace is connected by means of a chain to the ceiling or rafters, being preferably weighted to counterbalance the weight of the chamber, so that it may be easily lifted and remain in the position in which it is placed.

In Figs. 1 and 1ª I have shown the lower chamber of the furnace of approximately V shape in cross-section, to adapt it to the shape of the openings between the spokes of the metal wheels, (shown as being welded;) but the general form of the two parts of the furnace may be altered to conform to any class of work which may be operated upon in connection with the furnace. The movable chamber has a central opening in its lower face conforming in width to the width of the tire to be heated, and when the tire is put in place and the upper chamber brought down upon the lower the tire is held within the recesses in the two faces, the two chambers fitting snugly together on both sides thereof.

It will thus be seen that I provide a very simple arrangement of heating-chambers, which may be easily manipulated to insert the tires, and after they are inserted may be closed to exclude all air and prevent the steel or iron from oxidizing or scaling. The intensity of the heat is under regulation, and therefore may be uniform, and as there is a heating-chamber upon both sides of the point to be welded, the proper heat is secured in a very short time. This method is very economical both as to the fuel used, because the heat is intensified at this one point, and because of the quickness with which this work can be carried on.

While I have described and shown two heating-chambers adapted to heat the tire upon both sides at the same time, and while this is the preferred form, my invention is broad enough to include the use of a single chamber, though of course this would lessen the efficiency of the apparatus, as it would take a longer time to give the iron or steel a welding heat, as the heat could be applied only to one side, and the work would be of a lower grade than when two chambers were used, as the metal would be exposed at the point where it was being heated to the action of the atmosphere. It will be understood that gas may be used from a natural well or from an artificial supply, or vapor from petroleum may be supplied to the furnace from any suitable generating source. The air-pipe is in connection with a suitable blower.

Under some circumstances—as, for instance, when heavy work is to be treated—I may support the furnaces, so as to adapt them to revolve, to aid in the manipulation of the articles to be treated, as shown in Fig. 4. In this figure V represents a hollow standard suitably supported, with a circular plate mounted upon its upper end. This plate R' serves as a support for a revolving table, Q, which carries the lower chamber of the furnaces, which are of the construction described. The revolving table bears upon anti-friction rollers $a'$, arranged within an annular groove in the face of the plate R', and in order to brace the table against lateral strain, when heavy work is on one side only, I attach brackets T' to the under surface of the table, extending below the under surface of the plate R', and to these brackets I attach an annular ring, S', having a groove therein to receive anti-friction rollers, which bear against the under surface of the plate R'. In this construction I prefer to pass one of the pipes (either the air or fuel) up through the hollow standard connecting with the table, having a coupling on its end for the various connecting-pipes leading to the furnaces, the supply and branch pipes being provided with suitable regulating-valves. The supply has a swivel-connection, as at B', and so is permitted free movement with the table. The upper chambers or furnaces are likewise permitted to revolve, being supported on radial hollow arms extending from the main supply-pipe, which is connected, as shown at A, with a swivel, so as to allow the furnaces to be revolved.

The furnaces are supplied, as shown, with air and fuel by the cross and branch pipes leading from the upper supply-pipe to the lower branch pipes and from the lower supply to the upper branch. Instead of the pivoted connection shown in the other figures for the upper furnaces, I may use the connection shown at X, consisting of two elbows and two short sections of pipe, connected by an intermediate tubular piece.

I claim—

1. An apparatus for heating or welding, consisting of a suitable supporting-base, a heating-chamber supported thereby, the upper face of said chamber forming a support for the article to be heated, an opening in said chamber for the exit of the heat and flame against the article supported by said chamber, a fuel-supply, and a pipe-connection between said supply and the said chamber, substantially as described.

2. An apparatus for heating or welding, consisting of a chamber supported from a suitable base and extended outwardly to clear the same to form a supporting-bracket for the article to be heated, an opening in the top of said chamber in line with the position of the article to be heated, and a fuel-supply and pipe-connections to said chamber, substantially as described.

3. An apparatus for heating or welding, consisting of a heating-chamber forming a projecting bracket to support the article to be heated, an opening in said chamber for the exit of the heat and flame to the surface of the article above the same, a passage within said furnace, in connection with a gas or vapor supply, perforations between said passage and the chamber proper through a suitable pipe, and an air-supply for supplying the necessary air for combustion, substantially as described.

4. An apparatus for heating or welding, consisting of two heating-chambers, one arranged above the other and movable, with a space between the chambers for the insertion of the article to be heated, openings in the faces of each of said chambers to the two faces of the article, and a gas or vapor supply in connection with the chambers for supplying the necessary fuel for combustion and heating purposes, substantially as described.

5. In an apparatus for heating or welding, a pair of heating chambers or furnaces arranged one above the other, the lower one supporting the article to be heated and the upper one pivotally supported to allow of the insertion of the article between the chambers, openings in the face of each in line with each other for the exit of heat and flame, a gas-supply and air-supply, and connections between said supply-pipes and the chambers, one of said chambers being movable, substantially as described.

6. In combination, a heating-chamber supported upon a suitable base, an air and fuel supply in connection therewith, an opening therein for the exit of heat and flame, a second heating-chamber arranged above the first, pivoted so as to have a limited upward movement to allow for the insertion of the tire between it and the stationary chamber, with an opening in said upper chamber corresponding to that in the lower chamber, and a recess adapted to receive the work to be treated, and a pipe-connection from a fuel and air supply, substantially as described.

7. An apparatus for heating or welding tires or other metallic articles, consisting of a suitable supporting-stand, a stationary heating-chamber, connection with an air and fuel supply, a pivoted heating-chamber arranged above the stationary chamber, also in connection with the air and fuel supply, and means for elevating said pivoted chamber, substantially as described.

8. In combination with the described heating-chambers, pipe-connections with a fuel and air supply, valves for regulating or shutting off altogether the fuel-supply, valves for regulating the air-supply intermediate between the fuel-supply pipe and the heating-chambers, and blow-off pipes in the ends of the heating-chambers, whereby the said chambers may be cleaned by allowing a current of air to be blown through the same, substantially as described.

9. In an apparatus for heating or welding tires and other articles, the combination, with heating-furnaces and supply-pipes for the fuel and air of a support having a revolving-table for holding the stationary heating-chambers, and a support for the upper chambers adapted to revolve, substantially as described.

In testimony whereof I have signed my name to this specification in the presence of two subscribing witnesses.

HENRY C. P. LE PAN.

Witnesses:
FRED H. FOX,
O. G. RICHARDS.